US010268728B2

(12) United States Patent
Keohane et al.

(10) Patent No.: US 10,268,728 B2
(45) Date of Patent: Apr. 23, 2019

(54) PROVIDING SEARCH RESULT CONTENT TAILORED TO STAGE OF PROJECT AND USER PROFICIENCY AND ROLE ON GIVEN TOPIC

(71) Applicant: International Business Machines Corporation, Armonk, NY (US)

(72) Inventors: Susann M. Keohane, Austin, TX (US); Maureen E. Kraft, Hudson, MA (US); Brent N. Shiver, Auburn, MA (US)

(73) Assignee: International Business Machines Corporation, Armonk, NY (US)

( * ) Notice: Subject to any disclaimer, the term of this patent is extended or adjusted under 35 U.S.C. 154(b) by 723 days.

(21) Appl. No.: 14/931,950

(22) Filed: Nov. 4, 2015

(65) Prior Publication Data

US 2017/0124157 A1 May 4, 2017

(51) Int. Cl.
*G06F 17/30* (2006.01)
*G06Q 10/06* (2012.01)

(52) U.S. Cl.
CPC .. *G06F 17/30528* (2013.01); *G06F 17/30867* (2013.01); *G06Q 10/0639* (2013.01); *G06Q 10/06313* (2013.01); *G06Q 10/063114* (2013.01); *G06Q 10/063118* (2013.01)

(58) Field of Classification Search
CPC .......... G06Q 10/06; G06Q 10/063114; G06Q 10/063118; G06Q 10/0639; G06Q 10/06398; G06Q 10/0631; G06Q 10/06311; G06Q 10/063112; G06Q 10/06313; G06Q 10/06395; G06Q 10/101; G06Q 10/1097; G06F 17/30867; G06F 3/0482; G06F 17/30554
See application file for complete search history.

(56) References Cited

U.S. PATENT DOCUMENTS

| 8,239,377 | B2 | 8/2012 | Milic-Frayling et al. | |
|---|---|---|---|---|
| 8,799,316 | B1 | 8/2014 | Bahrami et al. | |
| 2004/0015465 | A1* | 1/2004 | Gill | G06Q 10/06 706/50 |
| 2005/0021348 | A1* | 1/2005 | Chan | G06Q 10/067 706/45 |
| 2005/0097016 | A1* | 5/2005 | Barnard | G06Q 10/06 705/30 |

(Continued)

OTHER PUBLICATIONS

High, Rob, "The Era of Cognitive Systems: An Inside Look at IBM Watson and How it Works", IBM Corporation, Redbooks, Dec. 12, 2012, 16 pages.

(Continued)

*Primary Examiner* — Merilyn P Nguyen
(74) *Attorney, Agent, or Firm* — Stephen R. Tkacs; Stephen J. Walder, Jr.; Mercedes L. Hobson (57) ABSTRACT

A mechanism is provided in a data processing system for presentation delivery. The mechanism receives a search request comprising one or more search terms from a user. The mechanism determines the current stage of a project of the user. The mechanism determines a user role and skill level of the user. The mechanism searches a corpus of information to generate search results based on the one or more search terms. The mechanism presents the search results to the user based on the current stage of the project, the user role and skill level of the user.

18 Claims, 4 Drawing Sheets

(56) References Cited

U.S. PATENT DOCUMENTS

| | | | |
|---|---|---|---|
| 2006/0044307 A1* | 3/2006 | Song | G06Q 10/06 345/419 |
| 2006/0117388 A1* | 6/2006 | Nelson | G06F 11/008 726/25 |
| 2006/0235732 A1* | 10/2006 | Miller | G06Q 10/06 705/7.23 |
| 2007/0124346 A1* | 5/2007 | Mitchel | G06Q 10/06 |
| 2008/0052146 A1* | 2/2008 | Messinger | G06Q 10/06 705/7.23 |
| 2008/0222550 A1* | 9/2008 | Beutler | G06Q 10/06 715/772 |
| 2008/0288322 A1* | 11/2008 | Kennedy | G06Q 10/06 705/7.15 |
| 2009/0287678 A1 | 11/2009 | Brown et al. | |
| 2011/0066587 A1 | 3/2011 | Ferrucci et al. | |
| 2011/0125734 A1 | 5/2011 | Duboue et al. | |
| 2012/0269116 A1 | 10/2012 | Xing et al. | |
| 2013/0007055 A1 | 1/2013 | Brown et al. | |
| 2013/0018652 A1 | 1/2013 | Ferrucci et al. | |
| 2013/0066886 A1 | 3/2013 | Bagchi et al. | |
| 2014/0129542 A1 | 5/2014 | Haveliwala et al. | |
| 2014/0136294 A1* | 5/2014 | Martinovic | G06Q 10/06375 705/7.37 |
| 2015/0317571 A1* | 11/2015 | Maetz | G09C 5/00 386/278 |
| 2016/0261475 A1* | 9/2016 | Jadhav | G06F 17/30861 |
| 2016/0364675 A1* | 12/2016 | Sharma | G06Q 10/063114 |

OTHER PUBLICATIONS

McCord, M.C. et al., "Deep parsing in Watson", IBM J. Res. & Dev. vol. 56 No. 3/4 Paper 3, May/Jul. 2012, pp. 3:1-3:15.

Sieg, Agu et al., "Learning Ontology-Based User Profiles: A Semantic Approach to Personalized Web Search", IEEE Intelligent Informatics Bullentin, Nov. 2007, vol. 8 No. 1, Technical Committee on Intelligent Informatics ( TCII ) of the IEEE Computer Society, 12 pages.

Yuan, Michael J., "Watson and healthcare, How natural language processing and semantic search could revolutionize clinical decision support", IBM developerWorks, IBM Corporation, Apr. 12, 2011, 14 pages.

* cited by examiner

PROVIDING SEARCH RESULT CONTENT TAILORED TO STAGE OF PROJECT AND USER PROFICIENCY AND ROLE ON GIVEN TOPIC

BACKGROUND

The present application relates generally to an improved data processing apparatus and method and more specifically to mechanisms for providing search result content tailored to user proficiency and role on given topic and experience by like users.

Accessibility refers to the design of products, devices, services, or environments for people with disabilities. The concept of accessible design ensures both "direct access" (i.e., unassisted) and "indirect access" meaning compatibility with a person's assistive technology (for example, computer screen readers). Accessibility can be viewed as the "ability to access" and benefit from some system or entity. The concept focuses on enabling access for people with disabilities or special needs or enabling access through the use of assistive technology; however, research and development in accessibility brings benefits to everyone.

Accessibility is not to be confused with usability, which is the extent to which a product (such as a device, service, or environment) can be used by specified users to achieve specified goals with effectiveness, efficiency and satisfaction in a specified context of use. Accessibility is strongly related to universal design which is the process of creating products that are usable by people with the widest possible range of abilities, operating within the widest possible range of situations. This is about making things accessible to all people (whether they have a disability or not).

Web Content Accessibility Guidelines (WCAG) are part of a series of web accessibility guidelines published by the Web Accessibility Initiative (WAI) of the World Wide Web Consortium (W3C), the main international standards organization for the internet. They consist of a set of guidelines for making content accessible, primarily for people with disabilities, but also for all user agents, including highly limited devices, such as mobile phones. The current version, WCAG 2.0, was published in December 2008 and became an ISO standard, ISO/IEC 40500:2012 in October 2012.

SUMMARY

In one illustrative embodiment, a method, in a data processing system, is provided for presentation delivery. The method comprises receiving, by the data processing system, a search request comprising one or more search terms from a user. The method further comprises determining, by the data processing system, the current stage of a project of the user. The method further comprises determining, by the data processing system, a user role and skill level of the user. The method further comprises searching, by the data processing system, a corpus of information to generate search results based on the one or more search terms. The method further comprises presenting, by the data processing system, the search results to the user based on the current stage of the project, the user role and skill level of the user.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide mechanisms for providing search result content aggregated tailored to current stage of a user's project, user proficiency and role on a given topic and experience and feedback of like users. There are several Web based tools that help people understand Web Content Accessibility Guidelines (WCAG) requirements. These tools allow the user to filter WCAG by various categories such as technology, success criteria level, and so on. What is lacking is a system that learns about the user and helps the user find the answer to accessibility-related questions before the user even knows to ask. Accessibility information comes from many different structured and unstructured data sources and the user may not know what sources to search on to find the information appropriate to the user's needs. Current systems provide the ability to search a single data source and categorize or sort results based on topic; however, they do not tailor the results to the needs of the user.

The illustrative embodiments provide mechanisms that search unique structured and unstructured data sources to provide an interactive search experience that tailors resulting content to the user's needs based on the user's current stage in a project, skill level, time spent on the query, and a profile of the user compared to similar users including experience on and current stage of project. The mechanisms of the illustrative embodiments profile the user and other similar users to provide answers to questions the user may not have known to ask or where to find answers. The mechanisms automate the content management process by generating action items and data analysis of where the user is struggling and identifying where further content is needed.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 1:
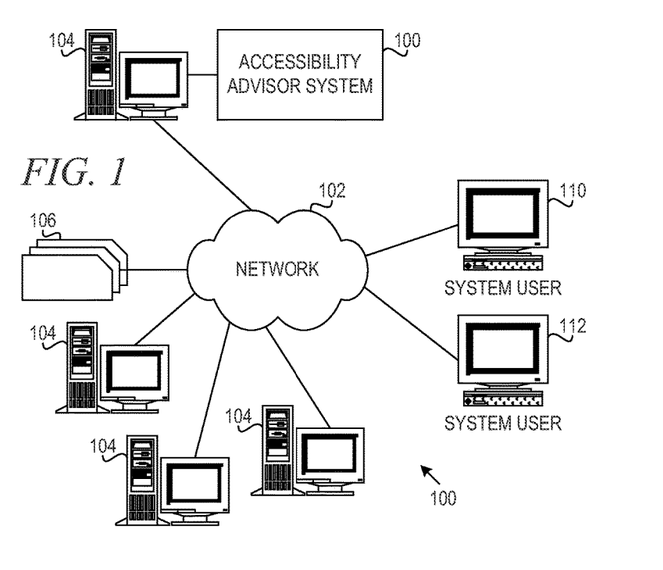
FIG. 1 depicts a schematic diagram of one illustrative embodiment of an accessibility advisor system in a computer network in accordance with an illustrative embodiment.
Figure 2:
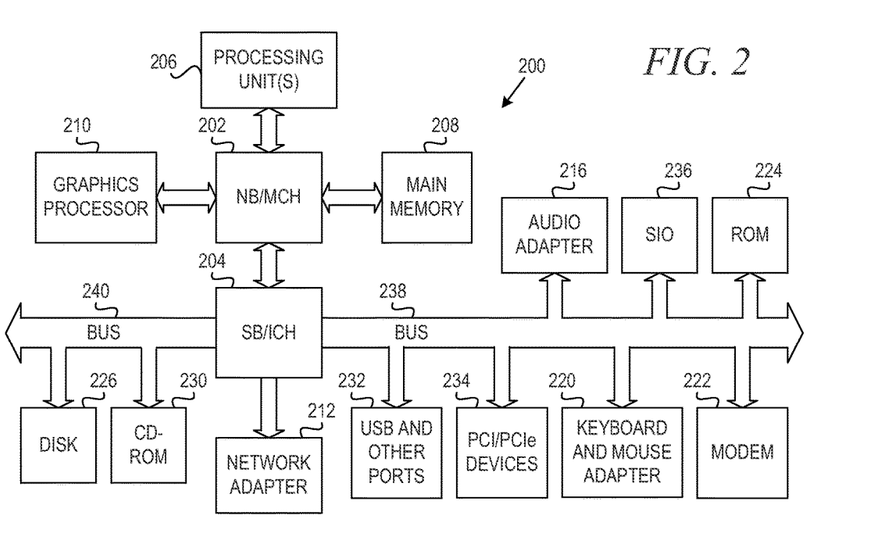
FIG. 2 is a block diagram of an example data processing system in which aspects of the illustrative embodiments are implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIGS. 1 and 2 are directed to describing an example accessibility advisor system, methodology, and computer program product with which the mechanisms of the illustrative embodiments are implemented. As will be discussed in greater detail hereafter, the illustrative embodiments are integrated in, augment, and extend the functionality of an Enterprise search system. Enterprise search is the practice of making content from multiple enterprise-type sources, such as databases and intranets, searchable to a defined audience. Enterprise search can be contrasted with web search, which applies search technology to documents on the open web, and desktop search, which applies search technology to the content on a single computer. Enterprise search systems index data and documents from a variety of sources, such as file systems, intranets, document management systems, e-mail, and databases. Many Enterprise search systems integrate structured and unstructured data in their collections. Enterprise search systems also use access controls to enforce a security policy on their users.

FIG. 1 depicts a schematic diagram of one illustrative embodiment of an accessibility advisor system 100 in a computer network 102. In one embodiment, accessibility advisor system 100 uses an Enterprise level search system to search a corpus 106 of accessibility documents. Accessibility advisor system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The accessibility advisor system 100 and network 102 enable Enterprise level search functionality for one or more system users via their respective computing devices 110-112. Other embodiments of the system 100 may be used with components, systems, sub-systems, and/or devices other than those that are depicted herein.

The accessibility advisor system 100 is configured to implement an Enterprise level search system that receives inputs from various sources. For example, the accessibility advisor system 100 receives input from the network 102, a corpus of electronic documents 106, system users 110, 112, and/or other data and other possible sources of input. In one embodiment, some or all of the inputs to the accessibility advisor system 100 are routed through the network 102. The various computing devices 104 on the network 102 include access points for content creators and system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the accessibility advisor system 100 may operate in environments of any size, including local and global, e.g., the Internet.

In one embodiment, the content creator creates content in a document of the corpus of data 106 for use as part of a corpus of data with the accessibility advisor system 100. The document includes any file, text, article, or source of data for use in the accessibility advisor system 100. System users access the accessibility advisor system 100 via a network connection or an Internet connection to the network 102, and input questions to the accessibility advisor system 100 that are answered by the content in the corpus of data 106. In one embodiment, the questions are formed using natural language. The accessibility advisor system 100 parses and interprets the question, and provides a response to the system user, e.g., system user 110, containing one or more answers to the question. In some embodiments, the accessibility advisor system 100 provides a response to users in a ranked list of candidate answers while in other illustrative embodiments, the accessibility advisor system 100 provides a single final answer or a combination of a final answer and ranked listing of other candidate answers.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements an accessibility advisor system 100 augmented to include the additional mechanisms of the illustrative embodiments described hereafter.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft™ Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
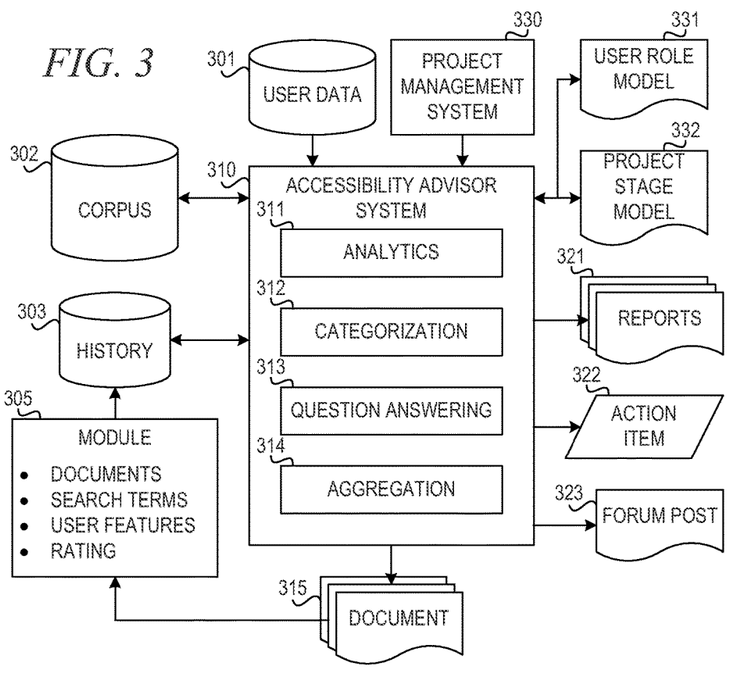
FIG. 3 is a block diagram illustrating an accessibility advisor system in accordance with an illustrative embodiment.

FIG. 3 is a block diagram illustrating an accessibility advisor system in accordance with an illustrative embodiment. While the depicted example is specific to accessibility, the illustrative embodiments apply to any search of information using a question answering system. Accessibility advisor system 310 comprises analytics component 311, categorization component 312, question answering component 313, and aggregation component 314. Accessibility advisor system 310 is an interactive system that analyzes user data, delivers results to the user, provides output to administrators, and feeds data to other destinations, such as forums or portals.

Analytics component 311 collects data about the user from the user's profiles in user data 301, such as those stored in a company directory or expertise system along with data from social media. For example, an expertise system can determine a level of expertise to guide output in a correct level of results for the user in a language the user would understand.

Analytics component 311 performs analytics on user data 301 collected about the user and historical questions/interactions 303 with the system 310. Analytics component 311 performs analytics on the pool of user data 301 to track and identify different user categories (e.g., job role, development phase of the project, experience, and so forth). This influences the results delivered to the user. In one example embodiment, the user's job role and the development phase of the project are self-identified. For instance, user data may include a company directory, which identifies job role as the user's job title.

In accordance with the illustrative embodiment, analytics component 311 collects additional information, such as the user's knowledge level, job role, and phase of the project. For example, if currently on a project, analytics component 311 collects the project's current stage of development and technologies used. This information can be updated by the user. In one embodiment, analytics component 311 communicates with the project management system 330 and accesses a user profile, the phase of the project, and other information directly.

In another embodiment, analytics component 311 quizzes the user to determine the level of understanding to provide the appropriate results for the user's skill level, to determine the user's job role, and to determine the development phase of the project.

Categorization component 312 categorizes the user based on job role, experience level, etc. In one embodiment, corpus 302 may store a group of key terms for particular stages of development and a group of key terms for particular user roles. For example, the terms "backlog" and "requirements" are likely to be used by a project manager, "check-in" or "delivery" by a developer, and "defect" or "test case" by a tester. Categorization component 312 then determines the user role and phase of development of the project based on keywords used in the user's query.

In another embodiment, categorization component 312 determines the user role and phase of development based on respective machine learning models (not shown). User role machine learning model 331 is initially based on the group of key terms for user roles. Project stage machine learning model 332 is initially based on the group of key terms for particular stages of development. As users provide feedback about search results, accessibility advisor system 310 adjusts weights/coefficients in user role model 331 and project stage model 332.

In one embodiment, the machine learning models 331, 332 are logistic regression models. In statistics, logistic regression is a regression model where the dependent variable is categorical. Logistic regression measures the relationship between the categorical dependent variable and one or more independent variables by estimating probabilities using a logistic function. Logistic regression produces a score between 0 and 1 according to the following formula:

$$f(x) = \frac{1}{1 + e^{-\beta_0 - \sum_{m=1}^{M} \beta_m x_m}},$$

where m ranges over the M features for instance x and $\beta_0$ is the "intercept" or "bias" term.

An instance x is a vector of numerical feature values, corresponding to one single occurrence of whatever the logistic regression is intended to classify. Output f(x) is used like a probability, and learned parameters $\beta_m$ are interpreted as "weights" gauging the contribution of each feature. For example, a logistic regression to classify carrots as edible or inedible would have one instance per carrot, and each instance would list numerical features such as the thickness and age of that carrot. The training data consist of many such instances along with labels indicating the correct f(x) value for each (e.g., 1 for edible and 0 for inedible carrots). The learning system computes the model (the $\beta$ vector) that provides the best fit between f(x) and the labels in the training data. That model, shown as 0 above, is then used on test data to classify instances.

In the illustrative embodiment, instances correspond to individual queries, user roles, and stages of a project, and the numerical values for the instance vector are features, such as keywords or other data discovered about the user or the query. The labels on training data, such as the groups of key terms described above, encode whether an instance is of a particular user role or stage of development. Thus, the machine learning component within categorization component 312 learns the values for the $\beta$ vector that best distinguish user roles or stage of development for the training data. Those $\beta$ values are then used on input text to determine the user role and development phase of the project. Categorization component 312 then adjusts the $\beta$ values based on user feedback during actual use.

Question answering component 313 finds resulting content in response to query terms or questions entered by searching multiple data sources in corpus 302 and filters the answer against the data collected about the user. Question answering component 313 provides one or more documents 315 representing or supporting answers to questions entered by the user.

Aggregation component 314 delivers topic focused modules 305 based on the search term(s) entered by the user. Aggregation component 314 aggregates results 315 from one to many sources and delivers the aggregated results to the user. For example, aggregation component 314 may return a module 305 about multi-media accessibility aggregated from the results of a user's search on the terms "synchronized video." Aggregation component 314 may store module 305 with the documents 315, search terms, user features (e.g., expertise level, job role, etc.), and a user rating. Aggregation component 314 may generate module 305 automatically based on the types of search questions asked and results returned to the user (in text, video, presentation, or other formats as training aids.

Accessibility advisor system 310 personalizes the output based on user preferences, such as font size, captions, layout widgets used (e.g., word cloud versus list), etc. Accessibility advisor system 310 pushes out preferences to the Global Public Inclusive Infrastructure (GPII), which is a software and service enhancement to our broadband infrastructure.

Accessibility advisor system 310 stores modules 305 in history 303 so they can be shared with similar types of users. Similar users may be users with a common job role, stage of development, knowledge of accessibility, and so on. Accessibility advisor system 310 scores the results based on the user data 301 in relation to the type of user. For example, accessibility advisor system 310 may output, "other Project Managers found this question to be 95% helpful," or "people who identified themselves as accessibility novice found this information to be 50% helpful."

In one embodiment, analytics component 311 analyzes the time on a task to find a helpful answer and provide the answer in a more simplistic alternative form or more in-depth detail based on the user's knowledge base (i.e., drill up or down). If someone is struggling with an answer and taking more time on the task, accessibility advisor system 310 sorts results based on the level of knowledge. For example, a novice may need to know the rationale of a technique while a more experienced user may need more details on a specific technique. Thus, accessibility advisor system 310 provides a "verbosity meter" that adjusts the breadth or depth of results based on the user's knowledge level. Accessibility advisor system 310 may also tailor the verbiage, acronym expansion for the user based on the analysis of user that determines the user's skill level. For example, if a user is a W3C member, accessibility advisor system 310 may use WCAG acronyms and, if not, the system may expand the acronym for the user.

A given user's skill level evolves as the user progresses through stages of development. Accessibility advisor system 310 uses quizzes to establish a baseline knowledge or expertise level. Accessibility advisor system 310 analyzes the query, type of query, amount of time spent on a topic, etc., to determine knowledge or expertise level of the user as the user progresses. For example, accessibility advisor system 310 may infer skill level because a user uses a synonym for a well-known term rather than the well-known term. For example, a novice user may be looking to "title" a table rather than give it a "caption." Accessibility advisor system 310 then updates the user profile or overrides the user profile with determined knowledge or expertise level.

In one embodiment, accessibility advisor system 310 generates daily, weekly, or monthly reports 321 that analyze the user interaction, trending topics, answers that were deemed unhelpful, etc. Administrators can use this information to improve guidance that is located on the data source fed into the system (i.e., finding gaps in current guidance). Accessibility advisor system 310 allows administrators to customize the frequency of days and times to generate these reports 321. The system 310 may determine that extra time spent on a task or extra queries to arrive at appropriate results indicates a gap in coverage.

Accessibility advisor system 310 captures and analyzes the time each user spends on a query and refines questions or generates suggested queries to help the user find the answer that is most relevant (i.e., where the user is struggling with the guidance provided). Based upon user's time spent combined with ratings or trend of a topic, accessibility advisor system 310 automatically generates an action item or task 322 for the content team to generate appropriate learning modules, visit and organize results to generate further guidance, such as articles or blog posts about the topic. Learning modules add or identify content, giving certain documents higher weight, for example.

In one embodiment, accessibility advisor system 310 generates a forum post 323 based on user's search if the user is dissatisfied with the results. Generally, each rule-based job has its own portal, and one looks to this portal or forum to find out what content is needed or what modules need tweaking.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
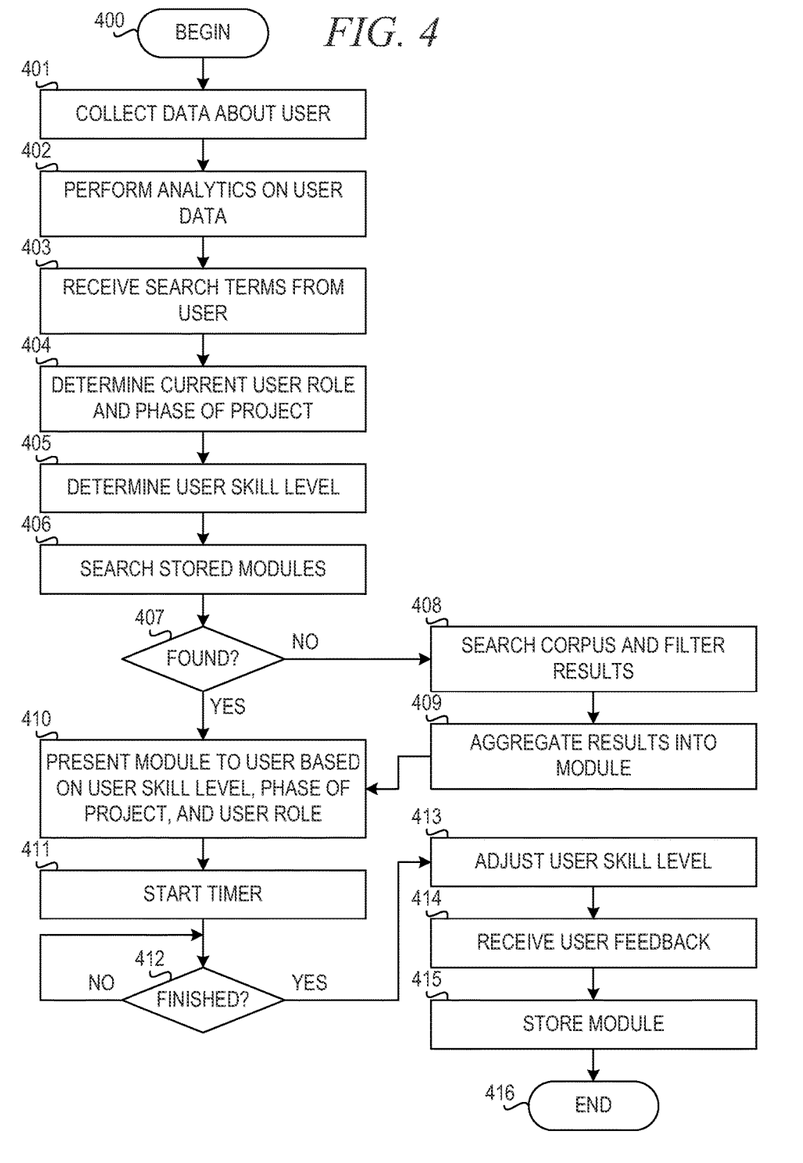
FIG. 4 is a flowchart illustrating operation of an accessibility search system in accordance with an illustrative embodiment.

FIG. 4 is a flowchart illustrating operation of an accessibility search system in accordance with an illustrative embodiment. Operation begins (block 400), and the system collects data about the user (block 401). The system performs analytics on user data (block 402). The system receives search terms from a user (block 403). The system determines the current user role and phase of the project (block 404) and determines a user skill level (block 405).

The system may determine the user role and phase of the project based on the search terms received in block 403. The system may match the search terms to key terms stored for particular user roles and key terms stored for particular development phases of a project. In another embodiment, the system may determine the user role and phase of the project using machine learning model. The system may initialize the machine learning models with known key terms for particular user roles and key terms for particular development phases of a project. The system adjusts the machine learning models based on feedback from like users.

The system then searches stored modules based on the search terms, current phase in the project, the user role, and feedback from like users (block 406). Searching the stored modules may comprise comparing feedback from like users. The system determines whether a stored module matches the search term and user skill level (block 407). If the system determines no matching module is found, the system searches multiple information sources in the corpus and filters results (block 408). The system aggregates the results into a module in association with the search term, user features, and user rating (block 409). The system then presents the results to the user based on the user skill level (block 410). If the system finds a matching module in block 406, the system presents the module to the user (block 410).

After presenting the module to the user, the system starts a timer (block 411). The system determines whether the user finishes viewing the content of the module (block 412). While the user views the content of the module, the timer continues to increment. The time spent on the query can influence the level of user skill, influence the complexity of the topic, and highlight the lack of or need for content for the queried topic. When the user finishes viewing the content of the module in block 412, the system adjusts the user skill level (block 413). Then, the system receives user feedback, such as a rating for the search results (block 414). The system then stores the module (block 415), and operation ends (block 416).

Figure 5:
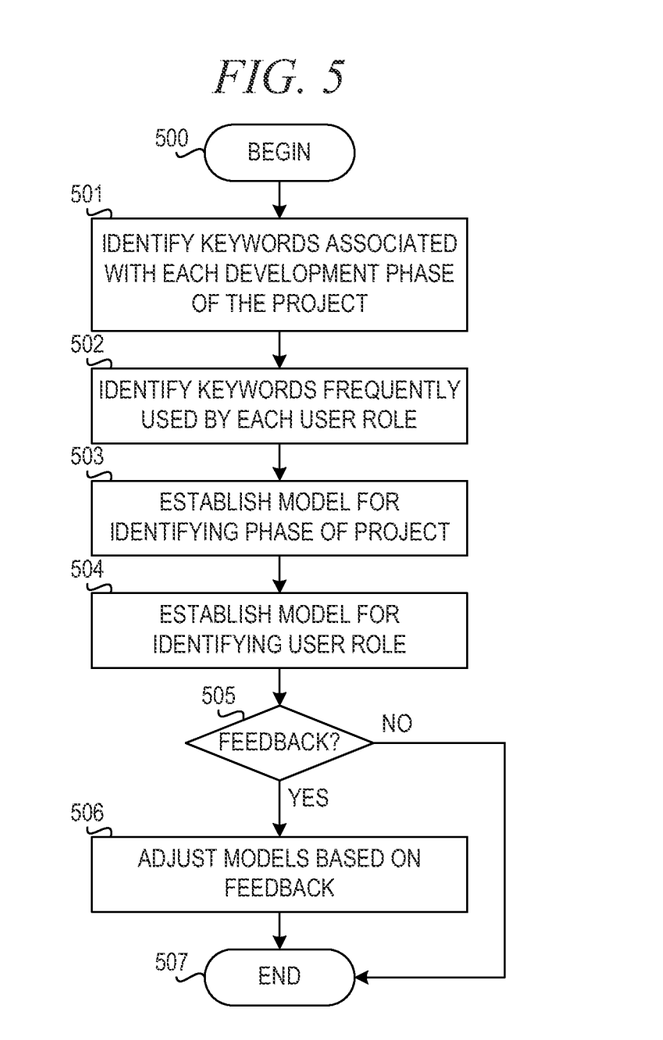
FIG. 5 is a flowchart illustrating operation of a system for determining user role and stage of development of a project in accordance with an illustrative embodiment.

FIG. 5 is a flowchart illustrating operation of a system for determining user role and stage of development of a project in accordance with an illustrative embodiment. Operation begins (block 500), and the system identifies keywords associated with each development phase of a project (block 501) and identifies keywords frequently used by each user role (block 502). The system establishes a model for identifying the phase of a project (block 503) and establishes a model for identifying the user's role (block 504). The models may be machine learning models that are initially trained based on the keywords identified in blocks 501, 502, for example.

The system determines whether feedback is received from users of known user role with a known development stage of a given project (block 505). If feedback is received, the system adjusts the models based on the user feedback (block 506). Thereafter, or if no feedback is received in block 505, operation ends (block 507).

Thus, the system may determine the user role and phase of the project from only the keywords used by the user. Alternatively, the system may determine the user role and phase of the project using a machine learning model. As described above, the machine learning model may be a logistic regression model, although other known machine learning models may be used within the spirit and scope of the illustrative embodiments. The system may then train coefficients in the machine learning models based on the key terms for each development phase and each user role. The system may then adjust those coefficients based on feedback from like users in block 506.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments aggregate the user's knowledge or skill level, role, experience on a project, current stage in the project, feedback from others in a similar role, and ability to tailor the search results to best meet the user's needs. Collected information about the project's current stage of development is a level of information that affects the results presented to the user by the system or application.

The system stores a history of the modules so they can be shared with similar types of users. The system scores the results or modules based on the user data in relation to the type user. The system also delivers topic-focused modules dynamically built based on the search terms entered. Thus, the system aggregates results from one or many sources and delivers the aggregated results to the user. Part of this process compares and reduces redundancy in the aggregated module returned based on the historical data and search terms entered.

The system analyzes time spent on a task to find a helpful answer and to provide the answer in a more simplistic alternative form or more in-depth detail based on the user's knowledge level. Based on the user's time spent combined with ratings or trend of a topic, the system automatically generates an action item or task for the content team to generate appropriate learning modules, visit and organize results, or generate further guidance, such as articles or blog posts about the topic. Thus, the system finds gaps in the data sources and guidance needed by the user based on the user's struggles and reactions to the data.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system having a processor and a memory, wherein the memory comprises instructions which are executed by the processor to cause the processor to implement an accessibility advisor system for providing search result content tailored to a stage of a project and user role, the method comprising:

receiving, by the accessibility advisor system, a search request comprising one or more search terms from a user to search at least one source of accessibility guideline information for a project of the user;

determining, by a categorization component executing within the accessibility advisor system, the current stage of the project of the user, wherein the categorization component executes to determine the current stage of the project of the user by applying a project stage machine learning model to the search request;

determining, by the categorization component, a user role of the user, wherein the categorization component executes to determine the user role of the user by applying a user role machine learning model to the search request, wherein determining the current stage of the project and the user role of the user comprises collecting data about the user and historical questions and interactions of the user and performing analytics on the collected data about the user and the historical questions and interactions;

searching, by a question answering component executing within the accessibility advisor system, the at least one source of accessibility guideline information to generate search results based on the one or more search terms;

filtering, by the question answering component, the search results based on the current stage of the project and the user role of the user to form filtered search results;

presenting, by the accessibility advisor system, the filtered search results to the user;

aggregating, by an aggregation component executing within the accessibility advisor system, the filtered search results in association with the one or more search terms, the current stage of the project, and the user role of the user to form a module; and storing, by the accessibility advisor system, the module in a history storage to be shared with similar users.

2. The method of claim 1, wherein project stage machine learning model is initialized with a group of key terms corresponding to each stage of the project.

3. The method of claim 1, wherein the user role machine learning model is initialized with a group of key terms corresponding to each user role.

4. The method of claim 1, wherein determining the current stage of the project and the user role of the user comprises collecting a user profile for the user from a company directory or expertise system.

5. The method of claim 1, wherein aggregating the search results comprises receiving a rating of the filtered search results from the user and aggregating the filtered search results in association with the rating.

6. The method of claim 1, wherein searching the at least one source of accessibility guideline information comprises submitting one or more queries to an enterprise level search system.

7. The method of claim 1, wherein the at least one source of accessibility guideline information comprises Web Content Accessibility Guidelines.

8. The method of claim 1, further comprising:

determining like users based the current stage of the project and the user role; and presenting the search results to the user based on feedback from the like users.

9. The method of claim 1, further comprising:
in response to receiving a subsequent search request from another user, searching the history storage based on a user role of the another user and the subsequent search request; and
in response to finding a module matching the subsequent search request and the user role of the another user, presenting the matching module to the another user.

10. The method of claim 9, further comprising receiving a rating of the matching module from the another user and storing the matching module in association with an adjusted rating.

11. The method of claim 1, further comprising tailoring verbiage and acronym expansion in the filtered search results based on a skill level of the user.

12. The method of claim 1, further comprising generating a report that analyzes user interaction, trending topics, and search results identified as being helpful.

13. The method of claim 1, further comprising generating an action item to generate learning modules, visit and organize results, or generate further guidance based on an amount of time the user spends on a given task, a user rating, or trend of a given topic.

14. The method of claim 1, further comprising generating a forum post to a portal based on a user rating.

15. A computer program product comprising a computer readable storage medium having a computer readable program stored therein, wherein the computer readable program, when executed on a computing device, causes the computing device to implement an accessibility advisor system for providing search result content tailored to a stage of a project and user role, wherein the computer readable program causes the computing device to:
receive, by the accessibility advisor system, a search request comprising one or more search terms from a user to search at least one source of accessibility guidance information for a project of the user;
determine, by a categorization component executing within the accessibility advisor system, the current stage of the project of the user, wherein the categorization component executes to determine the current stage of the project of the user by applying a project stage machine learning model to the search request;
determine, by the categorization component, a user role of the user, wherein the categorization component executes to determine the user role of the user by applying a user role machine learning model to the search request, wherein determining the current stage of the project and the user role of the user comprises collecting data about the user and historical questions and interactions of the user and performing analytics on the collected data about the user and the historical questions and interactions;
search, by a question answering component executing within the accessibility advisor system, the at least one source of accessibility guideline information to generate search results based on the one or more search terms;
filter, by the question answering component, the search results based on the current stage of the project and the user role of the user to form filtered search results;
present, by the accessibility advisor system, the filtered search results to the user;
aggregate, by an aggregation component executing within the accessibility advisor system, the filtered search results in association with the one or more search terms, the current stage of the project, and the user role of the user to form a module; and
store, by the accessibility advisor system, the module in a history storage to be shared with similar users.

16. The computer program product of claim 15, wherein the computer readable program further causes the computing device to:
in response to receiving a subsequent search request from another user, search the history storage based on a user role of the another user and the subsequent search request; and
in response to finding a module matching the subsequent search request and the user role of the another user, presenting the matching module to the another user.

17. An apparatus comprising:
a processor; and
a memory coupled to the processor, wherein the memory comprises instructions which, when executed by the processor, cause the processor to implement an accessibility advisor system for providing search result content tailored to a stage of a project and user role, wherein the instructions causes the processor to:
receive, by the accessibility advisor system, a search request comprising one or more search terms from a user to search at least one source of accessibility guidance information for a project of the user;
determine, by a categorization component executing within the accessibility advisor system, the current stage of the project of the user, wherein the categorization component executes to determine the current stage of the project of the user by applying a project stage machine learning model to the search request;
determine, by the categorization component, a user role of the user, wherein the categorization component executes to determine the user role of the user by applying a user role machine learning model to the search request, wherein determining the current stage of the project and the user role of the user comprises collecting data about the user and historical questions and interactions of the user and performing analytics on the collected data about the user and the historical questions and interactions;
search, by a question answering component executing within the accessibility advisor system, the at least one source of accessibility guideline information to generate search results based on the one or more search terms;
filter, by the question answering component, the search results based on the current stage of the project and the user role of the user to form filtered search results;
present, by the accessibility advisor system, the filtered search results to the user;
aggregate, by an aggregation component executing within the accessibility advisor system, the filtered search results in association with the one or more search terms, the current stage of the project, and the user role of the user to form a module; and
store, by the accessibility advisor system, the module in a history storage to be shared with similar users.

18. The apparatus of claim 17, further comprising:
in response to receiving a subsequent search request from another user, searching the history storage based on a user role of the another user and the subsequent search request; and in response to finding a module matching the subsequent search request and the user role of the another user, presenting the matching module to the another user.

* * * * *